United States Patent Office 3,436,517
Patented Apr. 1, 1969

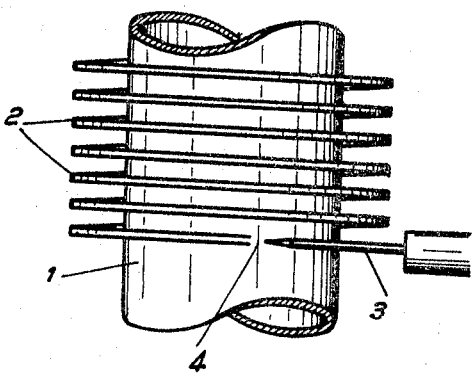
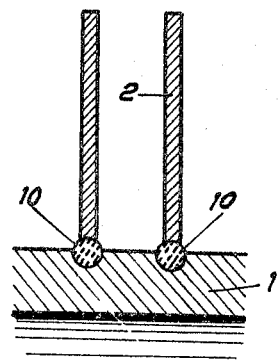
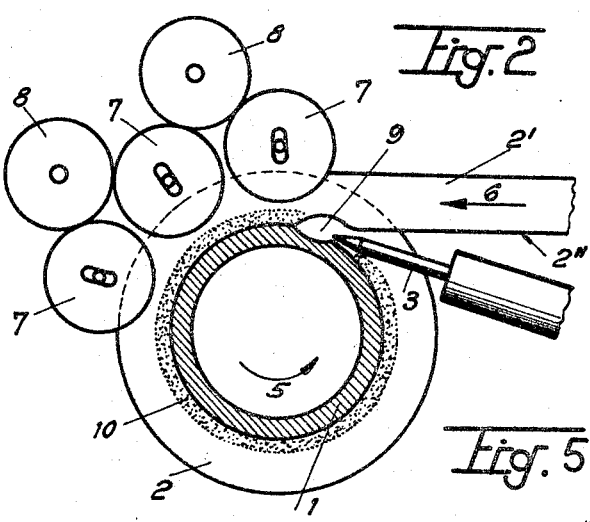
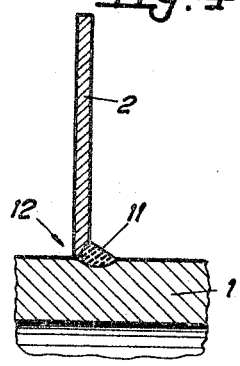
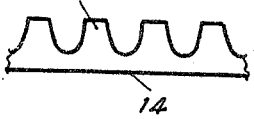
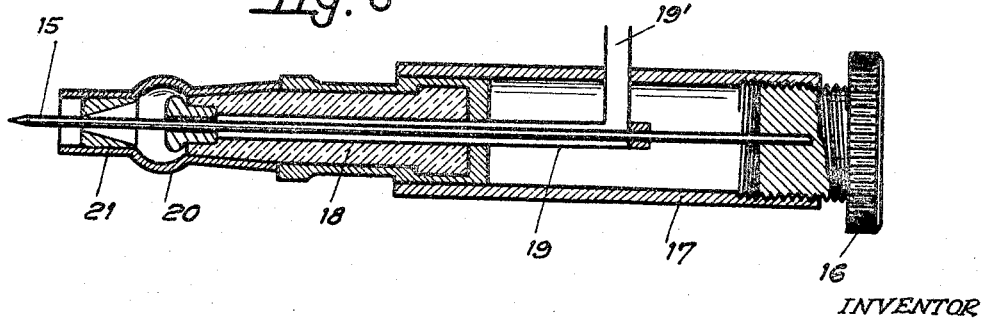

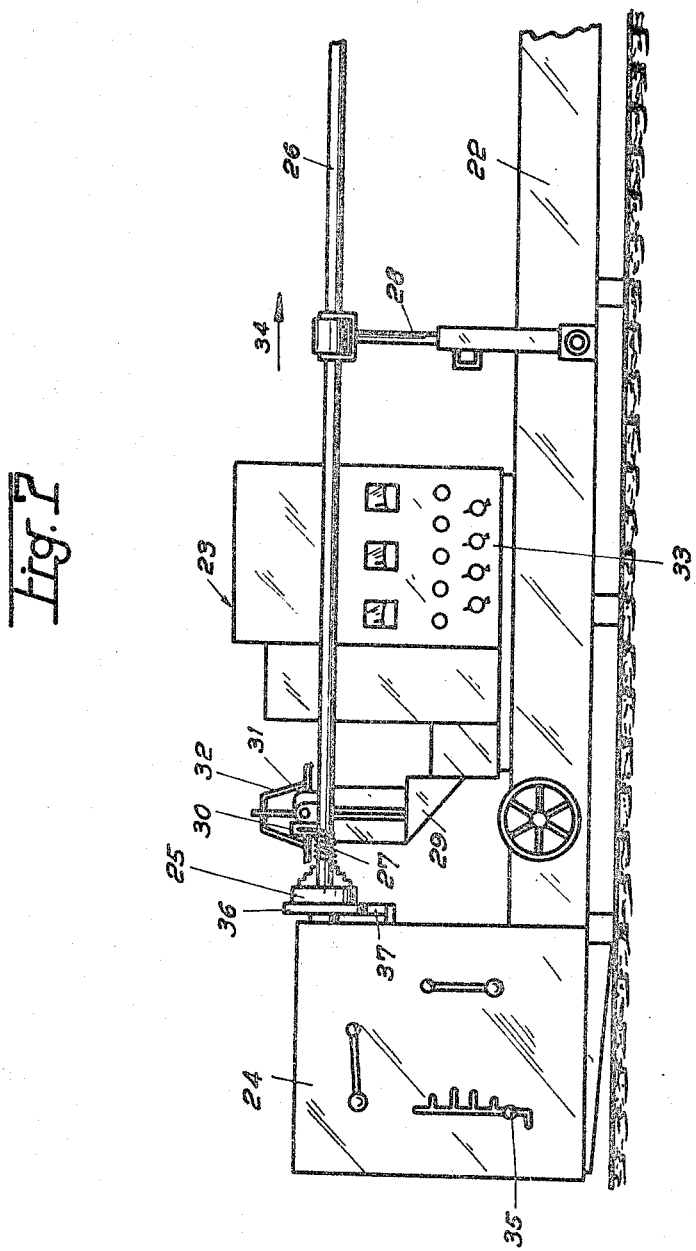

3,436,517
METHOD OF AND APPARATUS FOR MAKING FINNED TUBES
Edmond Pignal, Thonon-les-Bains, France, assignor to Biraghi (Societe Anonyme), Paris, France, a company of France
Filed Apr. 18, 1966, Ser. No. 543,166
Claims priority, application Switzerland, Apr. 26, 1965, 5,954/65
Int. Cl. B23k 9/12
U.S. Cl. 219—124                                12 Claims

ABSTRACT OF THE DISCLOSURE

A method of and apparatus for making finned tubes wherein a continuous strip is fed edgewise and tangentially with respect to a rotating tube, a non-consumable welding electrode is disposed between the tube and the strip in the plane of the latter to simultaneously heat the strip and the tube; then, as the last step in the continuous operation, the strip is pressed onto the tube whereby a weld is obtained that is substantially symmetrical with respect to the strip.

---

This invention relates to an improved method of forming a weld between a strip and a base and is in particular concerned with a method of and an apparatus for helically welding a strip on a tubular member in a continuous, automatic operation to make finned tubes used generally for heat exchange purposes.

It is known in the prior art to make finned tubes by hellically positioning a strip about a tube normal to the tangential planes thereof and welding the two members together by means of an electrode held laterally to said strip resulting in a weld that only extends along one side of the strip base.

Induction and high frequency welding used heretofore permit a rapid operation but small residual oxide particles may cause occlusions. Furthermore, welding operations of this type may cause splattering of the molten material on either side of the fin facilitiating corrosion. Also during resistance welding the cold wound strip is subjected to stresses that may cause brittleness. While in high frequency welding this latter disadvantage may be remedied by means of succesive continuous local annealing to reduce the inner stresses, such step has to be performed as an additional operation.

It is therefore a primary object of the invention to obviate the above noted disadvantages by providing a method of making an improved, symmetrical welded joint between a base and a strip being positioned normally thereto.

It is a further object of the invention to provide a method of and apparatus for making an improved, symmetrical welded joint between the outer face of a tubular member and a fin being helically wound thereabout in a unitary, continuous and automatic operation.

Briefly, according to one of the preferred methods of practicing the present invention, a continuous strip is helically welded about a tube by a welding means having a heat source positioned between the tube and the strip in the plane of the latter immediately adjacent and preceding the location where pressure means force the strip into an edgewise contact with the surface of the tube. The resulting weld is symmetrical abuot the plane of the strip and has substantially improved mechanical characteristics.

The invention will be better understood and further objects and advantages will become more apparent from the ensuing detailed specification of an exemplary embodiment taken in conjunction with the drawing, wherein:

FIG. 1 is a plan view of a finned tube with the strip partially removed to reveal the position of the welding means;

FIG. 2 is a schematic sectional front elevational view of a finned tube, strip pressure means and welding means;

FIG. 3 is a schematic sectional side elevational view of a finned tube obtained by the novel welding methods;

FIG. 4 is a schematic sectional side elevational view of a finned tube obtained by a method of the prior art;

FIG. 5 shows a length portion of a shaped strip;

FIG. 6 is an enlarged sectional view of an electrode and its holder preferably used in the presently described embodiment; and FIG. 7 is a schematic side elevational view of an apparatus for practicing the novel method.

Referring now to FIGS. 1 and 2, there is shown a blank tube 1 around which a thin metallic strip 2' is being helically wound in an edgewise relation to the tube. The strip is guided from a supply reel (not shown) onto the outer surface of the tube in such a manner that when the two members are brought into contact, the former lies in a plane substantially normal to the tangential plane of the tube but defines an angle other than 90° with the longitudinal axis of the tube. This angle depends on the desired pitch of the helix.

Between the edge 2″ of strip 2' and the outer face of tube 1 there is disposed a welding electrode 3 adapted to generate a welding heat source in the plane of strip 2' and in area 4 where strip 2' is brought into tangential contact with tube 1 as the latter rotates in the direction of arrow 5, the former is fed as indicated by arrow 6. The electrode 3 is connected to a current source through tube 1 in a conventional manner (not shown). As both the strip 2' and the adjacent portion of tube 1 are heated to welding temperatures, pressure is applied to strip 2' for urging the latter into firm contact with tube 1. This pressure which is radial with respect to tube 1 is provided directly by a plurality of serially arranged refractory guide rollers 7 urged into contact with the upper edge of strip 2' by pressure rollers 8. In addition to applying pressure to strip 2', the guide rollers 7 also ensure the desired angular positioning of the strip. The pressure rollers 8 are preferably connected to means (not shown) adapted to impart an adjustable force thereto.

In operation, an electric arc is generated in the contact area 9 of the strip 2' and the tube 1. As both the strip 2' and the tube 1 are current carrying members in the above described arrangement, an electric arc is generated both between the tube 1 and the electrode 3 on one hand and between the strip 2' and the electrode 3 on the other hand. The welding heat progressively melts an area immediately preceding the contact point of the rotary tube 1 and the strip while simultaneously melting a corresponding area of edge 2″. Fusion of the two parts is ensured by rollers 7, progressively forcing strip 2' into the melted area causing a slight thickening of the strip base which improves the heat exchange characteristics of the final product. As a result, a uniform weld 10 is obtained which, as shown in FIG. 3, a symmetrical with respect to the plane of the now formed continuous fin 2 and extends through the entire thickness thereof. This symmetry applies both to the slight lateral overflow of the molten material on either side of the fin and to the weld extending into the wall of tube 1.

The improved quality of the weld 10 will become more apparent when compared with weld 11 (FIG. 4) obtained with a welding electrode disposed laterally to the base of the strip in a conventional manner. As seen, the weld 11 is disposed at one side of the strip and extends only partially therethrough (usually only ⅓ of the strip thickness). Consequently, corrosion may freely attack the joint at location 12 and furthermore, mechanical failure of the joint due to stresses directed to the strip side may easily occur. It will further be noted that weld 11 significantly extends laterally of fin 2 which, unlike the improved weld 10, prevents small pitch winding of the strip.

The strip 2' shown in FIGS. 1–4 has straight edges and a rectangular cross-section. It is well understood that strips of other configurations may also be used. Thus, for a more rapid welding operation of the type hereinbefore described it may be advantageous to use a trip of which the contact edge has a rounded or triangular section. Such configurations generally limit the extent of transversal fusion substantially reducing the lateral displacement of the molten metal. Further, strips as shown in FIG. 5 may also be used. The strip depicted in FIG. 5 has teeth 13 that will eventually constitute the periphery of the fin and a straight edge 14 to be welded to tube 1 as described hereinbefore.

In FIG. 6 there is shown the structure of a preferred holder for an electrode described above in connection with FIGS. 1 and 2. The structure shown in FIG. 6 comprises a tungsten rod electrode 15 axially adjustable by means of a screw plug 16 threadedly engaged in one end of a hollow cylindrical member 17. A heat insulating sleeve 18 is secured to the other end of cylinder 17 and projects axially therefrom so as to surround a substantial portion of electrode 15. A tube 19, disposed coaxially with electrode 15, extends from the inside of cylinder 17 into sleeve 18 and is connected to a pressurized source of inert gas (not shown) by means of a laterally extending tube portion 19' having an opening in the wall of cylinder 17. The terminal or tip portion of electrode 15 is surrounded by nozzle 20 and diffuser 21. During the welding operation inert gas under pressure is directed to the location of welding thus protecting the weld against oxidation by the ambient air.

The holder described hereinabove and depicted in FIG. 6 may be fixedly attached to a support means for holding the electrode in position as shown in FIGS. 1 and 2.

Referring now to FIG. 7, there is schematically shown in side elevation an exemplary embodiment of an apparatus adapted to carry out the welding process described in detail hereinbefore. The apparatus comprises an elongated base 22 affixed to the floor and adapted to receive a framework, generally indicated at 23, horizontally slidable thereon. At one end of base 22 there is disposed a stationary control box 24 housing diverse driving mechanisms and supporting a rotary chuck 25. A blank tube 26 is inserted for rotary motion into chuck 25 and is supported by at least one upstanding prop 28.

To framework 23 there is attached a bracket 29 adapted to carry guide and pressure rollers 30 (corresponding to rollers 7 and 8 shown in FIG. 2), an electrode holder 31 and a reel 32 for receiving a supply of strip (not shown). The framework 23 also includes a control panel 33.

The mechanism adapted to rotate chuck 25 also imparts motion to a moving means such as a worm screw (not shown) disposed along base 22 and adapted to continuously move framework 23 in the direction of arrow 34. The pitch of the helically wound and welded fin 27 is determined by the linear speed of the framework 23 which may be controlled manually by means of lever 35 or by programming from control panel 33. The inclination of the rollers 30 and the electrode 31 with respect to the longitudinal axis of tube 26 may be adjustable by means not shown to obtain the desired pitch of the helical fin 27 and to ensure the correct position of the electrode during the welding operation.

The welding electrode 31 is connected to a current source (not shown) through tube 26, chuck 25, ring 36 and brush 37.

In order to maintain the electric resistance of the welding circuit constant during the entire work cycle, a conductor also connected to the current source may be clamped to the end of the tube 26 distal from chuck 25.

It will be understood that it is within the scope of the invention to replace electrode 31 by a blow pipe that generates the welding heat e.g. by means of an argon plasma flame.

It will be further understood that it is within the scope of the invention to practice the present novel method in welding strips to a planar base along a straight or curved line to form a finned product.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

What is claimed is:

1. A method of securing a strip to a base in a continuous operation comprising the following successive steps:
   (a) feeding said strip toward said base in a plane substantially normal thereto and substantially tangentially with respect to one edge of said strip,
   (b) simultaneously heating said base and marginal areas of said strip including said edge to welding temperatures by means of an arc welding tool, at least a terminal portion of which being disposed between said base and said strip in the plane thereof and immediately before the location where said edge arrives into a contacting relationship with said base and
   (c) joining the heated portions of said strip and said base by pressure means exerting a force to said strip in the plane thereof and in a direction substantially normal to said base.

2. A method as defined in claim 1, wherein said base is the outer face of a tube and said feeding step comprises advancing said strip toward said base in a plane substantially normal to the tangential plane of said base and at an angle to the longitudinal axis of said tube that is other than zero and other than 90 degrees to form a helical fin about said tube.

3. A method as defined in claim 1, wherein said pressure means exerts a force sufficient to deform that portion of said strip that is brought into contact with said base.

4. A method as defined in claim 1, wherein the portion of said strip to be brought into contact with said base has a triangular cross-section.

5. A method as defined in claim 1, wherein the portion of said strip to be brought into contact with said base has an arcuate cross-section.

6. A method as defined in claim 1, wherein said welding tool is an elongated electrode disposed in the plane of said strip.

7. A method as defined in claim 2, wherein said advancing means includes imparting a rotary motion to said tube.

8. An apparatus for securing a strip to a base in a continuous operation comprising,
   (a) means for advancing said strip towards said base,
   (b) means for guiding said strip substantially normal to said base,
   (c) arc heating means disposed between said base and said strip in the plane thereof to simultaneously heat to welding temperatures adjacent portions of said base and said strip, and
   (d) pressure means for urging said heated portions into contact by exerting a force to said strip in the plane thereof and in a direction substantially normal to said base.

9. An apparatus as defined in claim 8, wherein said guilding means and said pressure means include at least one roller engaging the edge of said strip remote from said base.

10. An apparatus as defined in claim 8, wherein said base is the outer face of a tube, said advancing means being adapted to cause a relative motion along a helical path between said tube on the one hand and said guiding means, said pressure means, and said heat source generating means as a unit on the other hand.

11. An apparatus as defined in claim 8, wherein said base is the outer face of a tube, said advancing means includes a first means for imparting a rotary motion at said tube about the longitudinal axis thereof, and second means for imparting a linear motion to said guiding means, said pressure means and said heat source generating means as a unit axially of said tube.

12. An apparatus as defined in claim 10, wherein said guiding means and said pressure means include at least one roller engaging the edge of said strip distal from said tube, said roller being angularly adjustable with respect to the longitudinal axis of said tube for guiding said strip about said tube in a helix of predetermined pitch.

References Cited

UNITED STATES PATENTS

| | | | |
|---|---|---|---|
| 2,107,831 | 2/1938 | Morseth | 219—107 |
| 2,874,263 | 2/1959 | Williams et al. | 219—61 |
| 2,909,649 | 10/1959 | Landis et al. | 219—137 |
| 2,965,744 | 12/1960 | Busse | 219—107 |
| 3,047,712 | 7/1962 | Morris | 219—107 |
| 3,182,179 | 5/1965 | Anderson | 219—137 |
| 3,233,074 | 2/1966 | Smith | 219—124 |
| 3,246,116 | 4/1966 | Anderson et al. | 219—124 |

RICHARD M. WOOD, *Primary Examiner.*

W. DEXTER BROOKS, *Assistant Examiner.*

U.S. Cl. X.R.

219—62

U.S. DEPARTMENT OF COMMERCE

PATENT OFFICE

Washington, D.C. 20231

UNITED STATES PATENT OFFICE
CERTIFICATE OF CORRECTION

Patent No. 3,436,517            April 1, 1969

Edmond Pignal

It is certified that error appears in the above identified patent and that said Letters Patent are hereby corrected as shown below:

In the heading to the printed specification, lines 4 and 5, "assignor to Biraghi (Societe Anonyme)" should read -- assignr to Societe des Fabrications Biraghi-Entrepose --. Column 1, line 20, "coninuous" should read -- continuous --; line 33, "hellically" should read -- helically --; line 46, "succesive should read -- successive --; line 66, "abuot" should read -- about --; Column 2, line 7, "methods" should read -- method --; line 61, "a" should read -- is --; Column 3, line 13, "trip" should read -- strip --; Column 4, line 73, "guilding" should read -- guiding --.

Signed and sealed this 24th day of March 1970.

(SEAL)
Attest:

Edward M. Fletcher, Jr.
Attesting Officer

WILLIAM E. SCHUYLER, JR.
Commissioner of Patents